United States Patent [19]

Satoh

[11] Patent Number: 5,564,325
[45] Date of Patent: Oct. 15, 1996

[54] VALVE MECHANISM FOR BOOSTER

[75] Inventor: Tohru Satoh, Saitama-Ken, Japan

[73] Assignee: Jidosha Kiki Co., Ltd., Tokyo, Japan

[21] Appl. No.: 458,357

[22] Filed: Jun. 2, 1995

[30] Foreign Application Priority Data

Jun. 30, 1994 [JP] Japan .................. 6-171638

[51] Int. Cl.$^6$ .................................. F15B 9/10
[52] U.S. Cl. ...................... 91/369.1; 91/376 R
[58] Field of Search ................ 91/369.1, 376 R, 91/533; 92/48, 96

[56] References Cited

U.S. PATENT DOCUMENTS

| | | | |
|---|---|---|---|
| 3,152,449 | 10/1964 | Schultz | 91/376 X |
| 4,491,058 | 1/1985 | Morin | 91/376 R |
| 4,643,076 | 2/1987 | Satoh . | |
| 4,719,842 | 1/1988 | Gautier et al. | 91/376 R X |
| 4,787,292 | 11/1988 | Tsuyuki et al. . | |
| 4,793,242 | 12/1988 | Kobayashi . | |
| 4,807,521 | 2/1989 | Uyama et al. . | |
| 4,846,047 | 7/1989 | Uyama et al. . | |
| 4,882,975 | 11/1989 | Shimamura et al. . | |
| 5,027,695 | 7/1991 | Inoue et al. . | |
| 5,279,203 | 1/1994 | Gautier et al. | 91/369.1 |
| 5,333,534 | 8/1994 | Uyama . | |
| 5,350,224 | 9/1994 | Nell et al. | 91/376 R X |
| 5,373,776 | 12/1994 | Uyama . | |

FOREIGN PATENT DOCUMENTS

| | | | |
|---|---|---|---|
| 2316894 | 10/1973 | Germany | 91/369.1 |
| 2044375 | 10/1980 | United Kingdom | 91/376 R |

*Primary Examiner*—Hoang Nguyen
*Attorney, Agent, or Firm*—Flynn, Thiel, Boutell & Tanis

[57] ABSTRACT

A brake booster, specifically, an improvement of a valve mechanism for booster is disclosed. According to the invention, the rear side of a curved portion of a valve element is surrounded by a retainer to be interrupted from the atmosphere. This prevents the atmospheric pressure from acting upon the curved portion of the valve element owing to the presence of the retainer.

7 Claims, 4 Drawing Sheets

VALVE MECHANISM FOR BOOSTER

FIELD OF THE INVENTION

The invention relates to a booster as used in a brake of an automobile, and more particularly, to a valve mechanism of booster.

DESCRIPTION OF THE PRIOR ART

A conventional valve mechanism for booster generally comprises an annular, first valve seat formed around the inner peripheral surface of a valve body, a valve plunger slidably fitted in the valve body inside the annular, first valve seat, an annular, second valve seat formed on the valve plunger, a valve element having a seating area which is adapted to be seated upon either first or second valve seat, a constant pressure passage communicating with a space located radially outward of a first seat defined by the contact between the first valve seat and the valve element, a pressure passage communicating with a space located radially inward of a second seat defined by the contact between the the second valve seat and the valve element, and a variable pressure passage communicating with a space located intermediate the first and the second seat.

The valve element comprises a tubular elastic body including a mount which is adapted to be mounted around the inner peripheral surface of the valve body, a curved portion extending radially inward from the mount in a curved configuration, and a seating area disposed on the distal end of the curved portion.

When the booster thus constructed is inoperative, the valve element is seated upon the second valve seat formed on the valve plunger to prevent a pressure fluid from flowing into the variable pressure passage, and is removed from the first valve seat, allowing a communication between the constant and the variable pressure passage. Under this condition, a constant and a variable pressure chamber formed across a power piston of the booster communicate each other through the constant and the variable pressure passage, and accordingly, no pressure differential acts upon the power piston, and thus the booster remains inoperative.

On the other hand, considering the valve mechanism, the inner periphery of the tubular valve body communicates with the pressure passage while the outer periphery communicates with the constant pressure passage, and the curved portion of the valve element extends radially inward in a curved manner from the mount which is mounted around the inner peripheral surface of the valve body, whereby the rear portion of the curved portion communicates with the pressure passage while the front portion of the curved portion communicates with the constant pressure passage. As a consequence, a pressure differential between the pressures prevailing in the pressure passage and the constant pressure passage acts upon the curved portion of the valve element, and acts through the curved portion to urge the seating area forwardly toward the first valve seat formed on the valve body.

In order to maintain the seating area of the valve element away from the first valve seat against the pressure differential which urges in this manner, a return spring is disposed between an input shaft mechanically coupled to the valve plunger and the valve body so as to maintain the valve plunger in its inoperative position which is retracted rearwardly by the resilience of the return spring. Accordingly, a resilience required of the return spring must be sufficient to overcome the pressure differential to urge the input shaft and the valve plunger rearwardly.

Unfortunately, when the diameters of the annular, first and second valve seats are increased in order to improve the operating response of the booster by increasing the channel areas of the constant pressure passage, the pressure passage and the variable pressure passage, it follows that the curved portion of the valve element will be urged with a greater force. This results in an increased resilience required of the return spring which acts to urge the valve plunger rearwardly. However, an increased resilience of the return spring results in a disadvantage that an input to initiate the operation of the booster is increased to degrade an operational feeling to a driver.

SUMMARY OF THE INVENTION

In view of the foregoing, the invention provides a valve mechanism for booster which is capable of reducing an input to initiate the operation of the booster to assure an enhanced operational feeling, by reducing the force with which the curved portion of the valve element is urged.

In a first aspect, the invention provides a valve mechanism for booster as mentioned above wherein a retainer is mounted around the inner peripheral surface of the valve body, and includes an annular wall which extends radially inward from the inner peripheral surface of the valve body, and a tubular portion which extends from the inner periphery of the wall to the inside of the curved portion of the valve element, with the inner peripheral surface of the curved portion of the valve element being formed with a sliding seal which is disposed in sliding contact with the outer peripheral surface of the tubular portion of the retainer to define a sealed chamber between the sliding seal and the wall, which chamber is in communication with the constant pressure passage.

According to a second aspect, the invention provides a valve mechanism for booster as mentioned above wherein a retainer is mounted around the inner peripheral surface of the valve body, and includes an annular wall extending radially inward from the inner peripheral surface of the valve body, and a tubular portion extending from the inner periphery of the wall to the inside of the curved portion of the valve element, the inner peripheral surface of the curved portion of the valve element being formed with a first sliding seal which is disposed in sliding contact with the outer peripheral surface of the tubular portion of the retainer to define a first sealed chamber between the first sliding seal and the wall, the outer periphery of the seating area of the valve element being formed with a second sliding seal which is disposed in sliding contact with the inner peripheral surface of the valve body to define a second sealed chamber between the second sliding seal and the curved portion, with the first and the second sealed chamber communicating with each other, and the second sealed chamber being in communication with the variable pressure passage.

According to the first aspect of the invention, the rear portion of the curved portion of the valve body which was disposed adjacent to the pressure passage in the conventional arrangement is surrounded by the retainer wall and the tubular portion, which defines a sealed chamber therein which is in turn in communication with the constant pressure passage. Accordingly, the pressure which prevails in the constant pressure passage acts upon both the front and the rear side of the curved portion, reducing the force which the curved portion is subject to when the booster is inoperative.

As a consequence, the resilience required of the return spring can be reduced, which in turn allows an input required to initiate the operation of the booster to be reduced, thus assuring an enhanced operational feeling.

According to the second aspect of the invention, the rear portion of the curved portion of the valve element is surrounded by the wall and the tubular portion of the retainer to define a first sealed chamber therein. The outer periphery of the seating area of the valve element is formed with a second sliding seal which is disposed in sliding contact with the inner peripheral surface of the valve body to define a second sealed chamber between the second sliding seal and the curved portion. The first and the second sealed chamber communicate with each other, and the second sealed chamber communicates with the variable pressure passage, so that the pressure which prevails in the variable pressure passage acts upon both the rear and the front side of the curved portion of the valve element which are located adjacent to the first and the second sealed chamber, respectively, thus reducing the force which the curved portion is subject to.

When the booster is operated, the first seat of the seating area becomes seated upon the first valve seat formed on the valve body to interrupt a communication between the constant and the variable pressure passage while the second seat moves away from the second valve seat on the valve plunger, allowing the variable pressure passage to communicate with the pressure passage. Under this condition, the rear portion of the seating area which is located adjacent to the second sealed chamber is subject to the pressure which prevails in the variable pressure chamber while the front portion of the seating area which is located adjacent to the constant pressure passage is subject to the pressure which prevails in the constant pressure chamber, thus allowing a pressure differential therebetween to urge the first seat of the seating area against the first valve seat. In this manner, the first seat of the seating area can be positively urged against the first valve seat to form a seal without increasing the resilience of the spring which is used to urge the first seat of the seating area against the first valve seat.

Above and other objects, features and advantages of the invention will become apparent from the following description of several embodiments thereof with reference to the attached drawings.

DETAILED DESCRIPTION OF EMBODIMENTS

Figure 1:
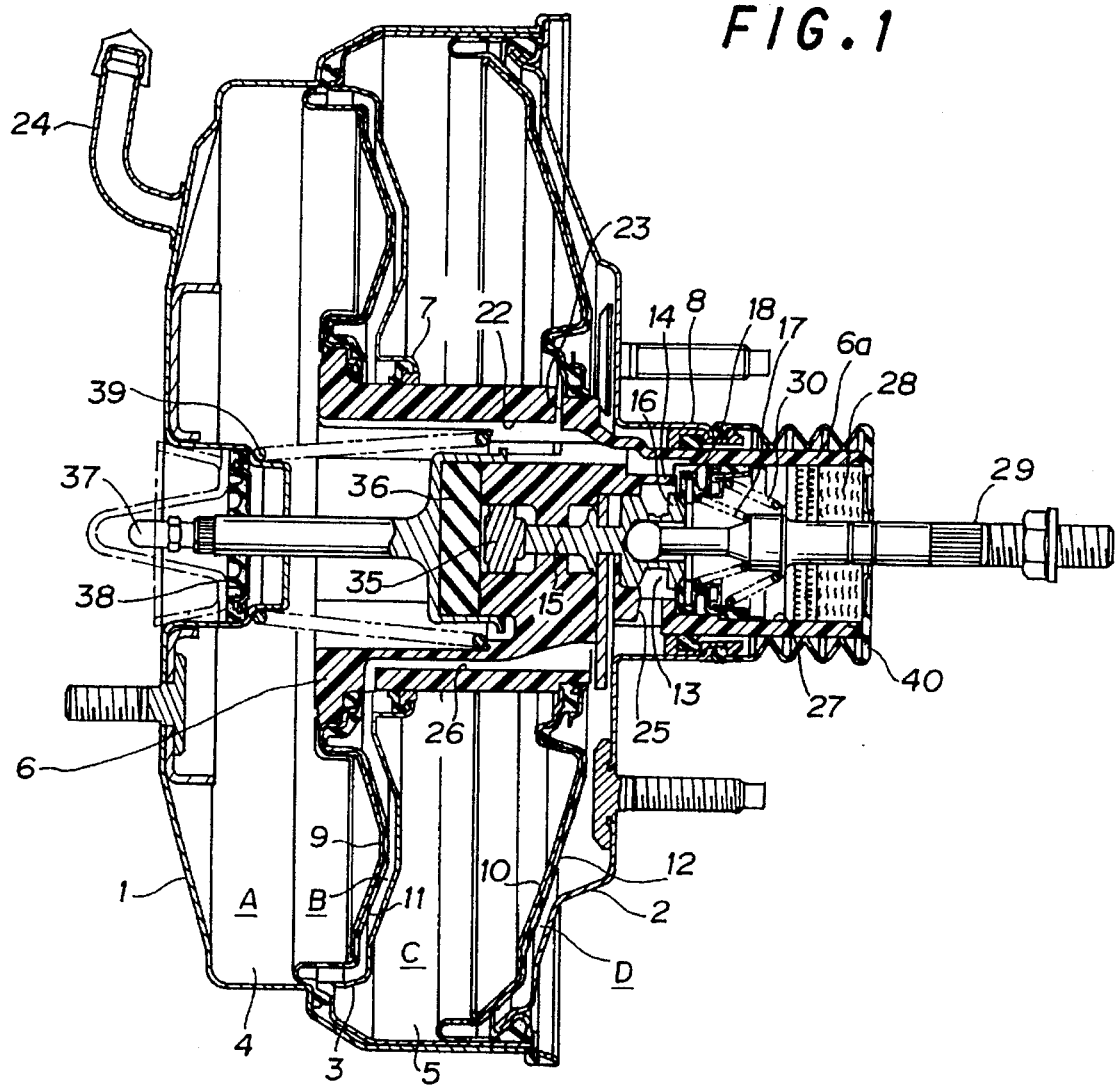
FIG. 1 is a cross section of one embodiment of the invention.

Referring to the drawings, several embodiments of the invention will now be described. In FIG. 1, an enclosed vessel is constructed by a front shell 1 and a rear shell 2, and a center plate 3 disposed centrally therein divides the interior of the vessel into a pair of front chamber 4 and rear chamber 5. A substantially tubular valve body 6 slidably extends through axial portions of the rear shell 2 and the center plate 3 with annular seal members 7, 8 interposed therebetween to maintain a hermetic seal.

Connected to the valve body 6 are a front power piston 9 and a rear power piston 10, which are disposed in the front chamber 4 and the rear chamber 5, respectively, and a front diaphragm 11 and a rear diaphragm 12 are applied to the back surfaces of the power pistons 9 and 10, respectively, thus defining a constant pressure chamber A and a variable pressure chamber B across the front diaphragm 11 and also a constant pressure chamber C and a variable pressure chamber D across the rear diaphragm 12.

A valve mechanism 13 for switching a fluid circuit between the two constant pressure chambers A, C and the two variable pressure chambers B, D is contained in the valve body 6, and comprises an annular, first valve seat 14 formed around the inner peripheral surface of the valve body 6, an annular, second valve seat 16 formed on the right end of a valve plunger 15 which is slidably disposed within the valve body 6 at a location radially inward of the annular, first valve seat 14, and a valve element 18 which is urged from the right, as viewed in FIG. 1, by a spring 17 so as to be seated upon either valve seat 14 or 16.

Figure 2:
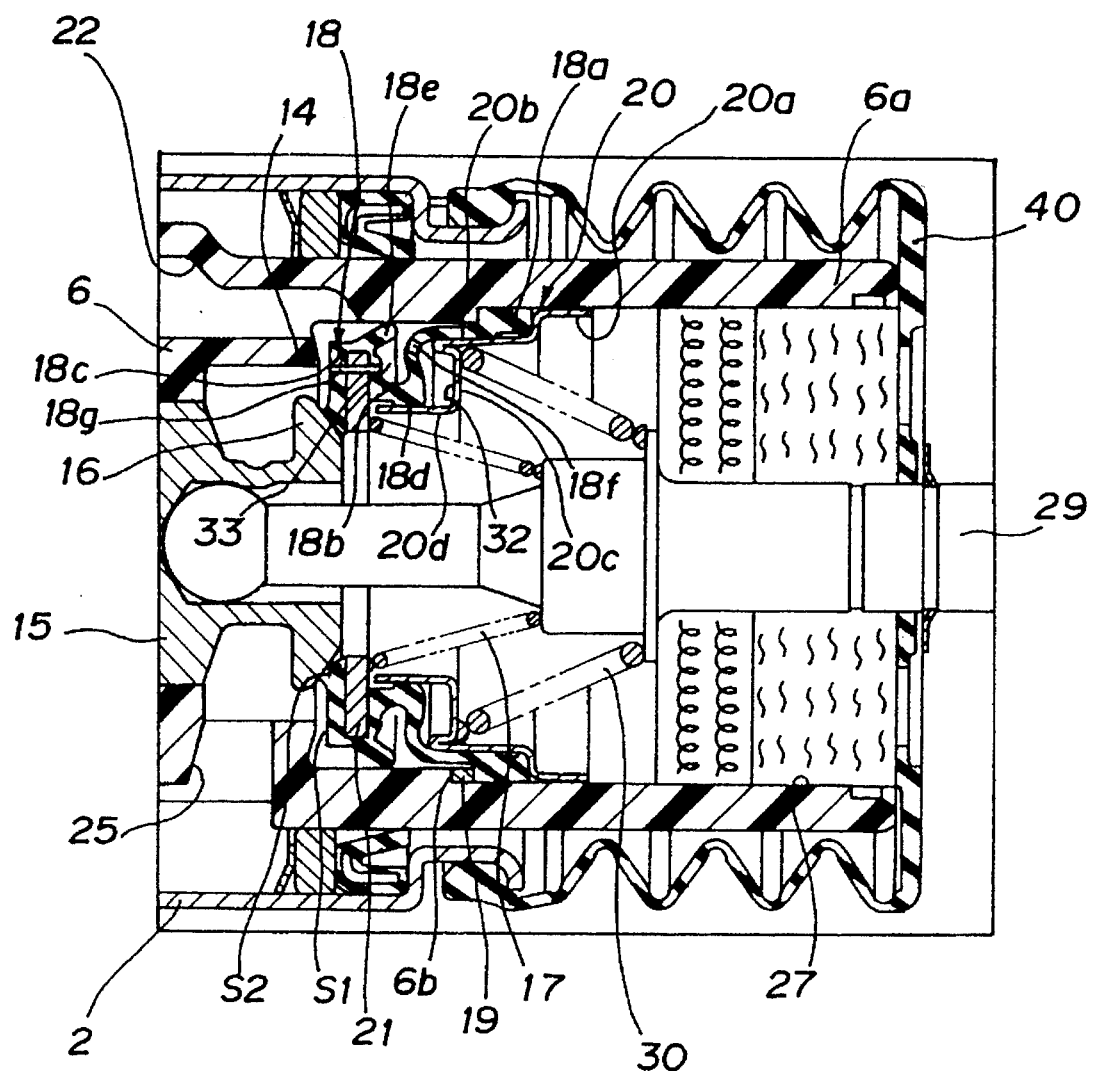
FIG. 2 is a cross section, to an enlarged scale, of part shown in FIG. 1.

The valve element 18 comprises a tubular elastic body, and as shown to an enlarged scale in FIG. 2, includes a mount 18a which is mounted around the inner peripheral surface of a tubular terminal end 6a of the valve body 6, a curved portion 18b extending radially inward in a curved manner from the mount 18a, and a seating area 18c which is located at a distal end of the curved portion 18b. The seating area 18c has a metallic backup plate 21 embedded therein.

The mount 18a is secured to the inner peripheral surface of the tubular terminal end 6a of the valve body 6 by utilizing a ring-shaped stop member 19 which is disposed forwardly of the mount in abutment against a step in the valve body 6, and a retainer 20 disposed rearwardly of the mount 18a. The seating area 18c comprises an annular, first seat S1 disposed for contact with the first valve seat 14, and an annular, second seat S2 disposed for contact with the second valve seat 16 at a location radially inward of the first seat S1. A space located radially outward of the first seat S1 communicates with the constant pressure chambers A and C through an axial constant pressure passage 22 and a radial constant pressure passage 23, both formed in the valve body 6, and the chamber A communicates with an intake manifold of an engine, not shown, through a tubing 24 which is used for introducing a negative pressure.

A space located intermediate the first and the second seat S1, S2 communicates with the variable pressure chamber D through a radial variable pressure passage 25 formed in the valve body 6, and the variable pressure chamber D in turn communicates with the variable pressure chamber B through an axial variable pressure passage 26 formed in the valve body 6. Finally, a space located radially inward of the second seat S2 communicates with the atmosphere, acting as a source of pressure fluid, through a pressure passage 27 in which a filter 28 is disposed.

A return spring 30 is disposed between an input shaft 29 and the retainer 20, whereby the input shaft 29 and its connected valve plunger 15 are urged rearwardly, thus normally maintaining its inoperative position shown.

The retainer 20 is tubular in configuration, and has its rear end 20a formed to the same diameter as the internal diameter of the tubular terminal end 6a, while a tubular portion 20b of an intermediate diameter is formed therein at a location forwardly of the rear end 20a, or more specifically, beyond a step therein so as to cover the mount 18a of the valve element 18, thus allowing the combination of the step, the tubular portion 20b and the stop member 19 to secure the mount 18a of the valve element 18 against the inner peripheral surface of the valve body 6. The opposite end of the tubular portion 20b is folded back axially rearwardly through a small distance, whereupon it is bent to extend radially inward to form an annular wall 20c, which in turn continues to a tubular portion 20d of a smaller diameter which extends inside the curved portion 18b of the valve element 18.

A first sliding seal 18d which is disposed in sliding contact with the outer peripheral surface of the tubular portion 20d of the retainer 20 is formed on the inner peripheral surface of the curved portion 18b of the valve element 18, namely, on the surface which faces the pressure passage 27, thereby defining a first sealed chamber 32 between the first sliding seal 18d and the wall 20c of the retainer 20.

In addition, a second sliding seal 18e which is disposed in sliding contact with the inner peripheral surface of the valve body 6 is formed around the outer periphery of the seating area 18c of the valve element 18, thus defining a second sealed chamber 33 between the second sliding seal 18e and the curved portion 18b which is covered by the inner peripheral surface of the valve body 6. The first sealed chamber 32 and the second sealed chamber 33 are allowed to communicate with each other through a communication opening 18f which is formed in the curved portion 18b, and the second sealed chamber 33 is allowed to communicate with the variable pressure passage 25 through a communication opening 18g which is formed in both the seating area 18c and the backup plate 21.

Returning to FIG. 1, the right end of the valve plunger 15 is pivotally connected to the distal end of the input shaft 29, the other end of which is connected to a brake pedal, not shown. On the other hand, a plunger plate 35 and a reaction disc 36 which is fitted in the right end of a push rod 37 are sequentially disposed to the left of the valve plunger 15.

The left end of the push rod 37 slidably extends through a seal member 38 and through an axial portion of the front shell 1 to the exterior thereof for connection with the piston of a master cylinder, not shown. The valve body 6 is normally maintained in its inoperative position shown by a return spring 39.

The tubular terminal end 6a projects axially rearward through an opening formed in the rear shell 2, and the projecting portion of the terminal end 6a is covered by a dust cover 40 formed of rubber.

In the described arrangement, when the booster is inoperative, the second seat S2 of the seating area 18c of the valve element 18 is seated upon the second valve seat 16 to interrupt the communication between the pressure passage 27 and the variable pressure passage 25, while the first seat S1 of the seating area 18c is located away from the first valve seat 14 to allow a communication between the variable pressure passage 25 and the constant pressure passage 22. Under this condition, a negative pressure is introduced into the variable pressure passage 25 and the constant pressure passage 22, and is thence introduced into the second sealed chamber 33 and the first sealed chamber 32 through the communication openings 18g, 18f.

Accordingly, the second sealed chamber 33 and the first sealed chamber 32, which are located forwardly and rearwardly of the curved portion 18b assume an equal pressure, and no force is applied which acts to drive the curved portion 18b forward. In addition, the constant pressure passage 22 located forwardly of, and the second sealed chamber 33 located rearwardly of the seating area 18c at its outer periphery also assume an equal pressure, whereby no force is applied to the seating area 18c which causes it to be driven forward.

In other words, in the conventional arrangement in which the wall 20c of the retainer 20 and the tubular portion 20d of the smaller diameter are not provided, the atmospheric pressure present within the pressure passage 27 acts upon the backup plate 21 or the curved portion 18b to drive the seating area 18c forward, but the present embodiment prevents the atmospheric pressure from acting upon the curved portion 18b, and hence, the force acting to drive the seating area 18c forward can be reduced, thus allowing the resilience required of the return spring 30 to be reduced. In the present embodiment having the second sliding seal 18e, it is also possible to reduce the resilience of the urging spring 17.

Specifically, when the booster is operative, the first seat S1 of the seating area 18c of the valve element 18 becomes seated upon the first valve seat 14 to interrupt a communication between the variable pressure passage 25 and the constant pressure passage 22, while the second seat S2 of the seating area 18c moves away from the second valve seat 16 to allow a communication between the pressure passage 27 and the variable pressure passage 25. Under this condition, the atmosphere is admitted into the variable pressure passage 25, and is thence introduced into the second sealed chamber 33 and the first sealed chamber 32 through the communication openings 18g, 18f. Accordingly, the front side of the seating area 18c which faces the variable pressure passage 25 and the rear side which faces the second sealed chamber 33 assume an equal pressure, thereby allowing the force which acts upon and tends to move the seating area 18c away from the first valve seat 14 to be reduced.

Stated differently, in a conventional arrangement which is not provided with the second sliding seal 18e or the second sealed chamber 33, the atmospheric pressure prevailing in the variable pressure passage 25 acts upon the front side of the seating area 18c while the negative pressure within the constant pressure passage 22 acts upon the rear side, whereby a pressure differential therebetween causes the seating area 18c to be driven back or rearwardly. To accommodate for this, it has been necessary to provide an increased resilience for the urging spring 17. However, when the force which tends to drive the seating area 18c rearwardly can be reduced in the manner mentioned above, the resilience required of the urging spring 17 can be reduced.

SECOND EMBODIMENT

Figure 3:
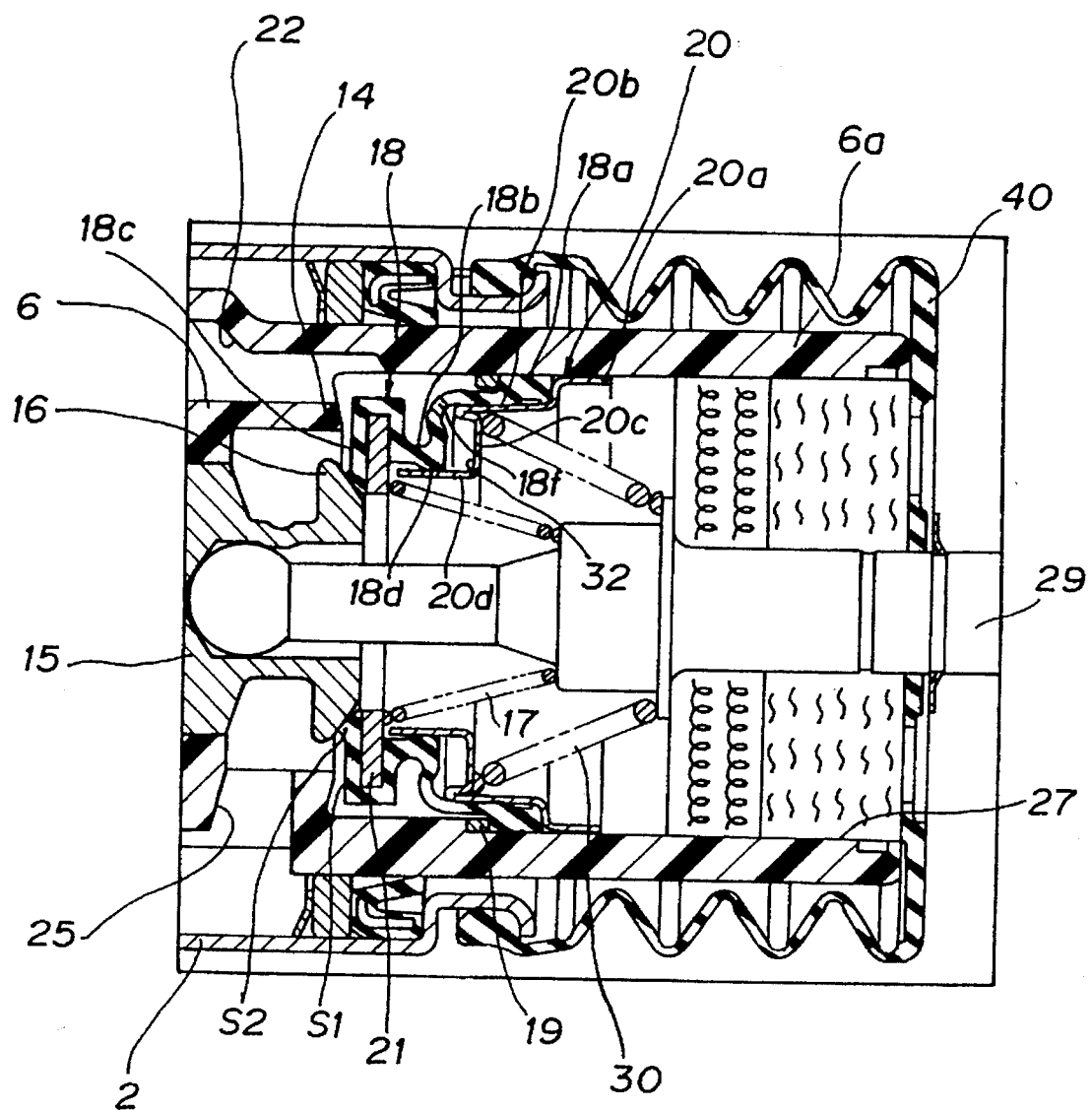
FIG. 3 is an enlarged section of part of a second embodiment of the invention.

FIG. 3 shows another embodiment of the invention in which the second sliding seal 18e is removed from the previous embodiment, together with the associated second sealed chamber 33 and the communication opening 18g. In this instance, the other sealed chamber 32 communicates with the constant pressure chamber 22 through the communication opening 18f. In other respects, the arrangement is similar to the previous embodiment, and accordingly, corresponding parts are designated by like reference numerals and characters. Again, it is apparent that the resilience required of the return spring 30 can be reduced as before.

THIRD EMBODIMENT

Figure 4:
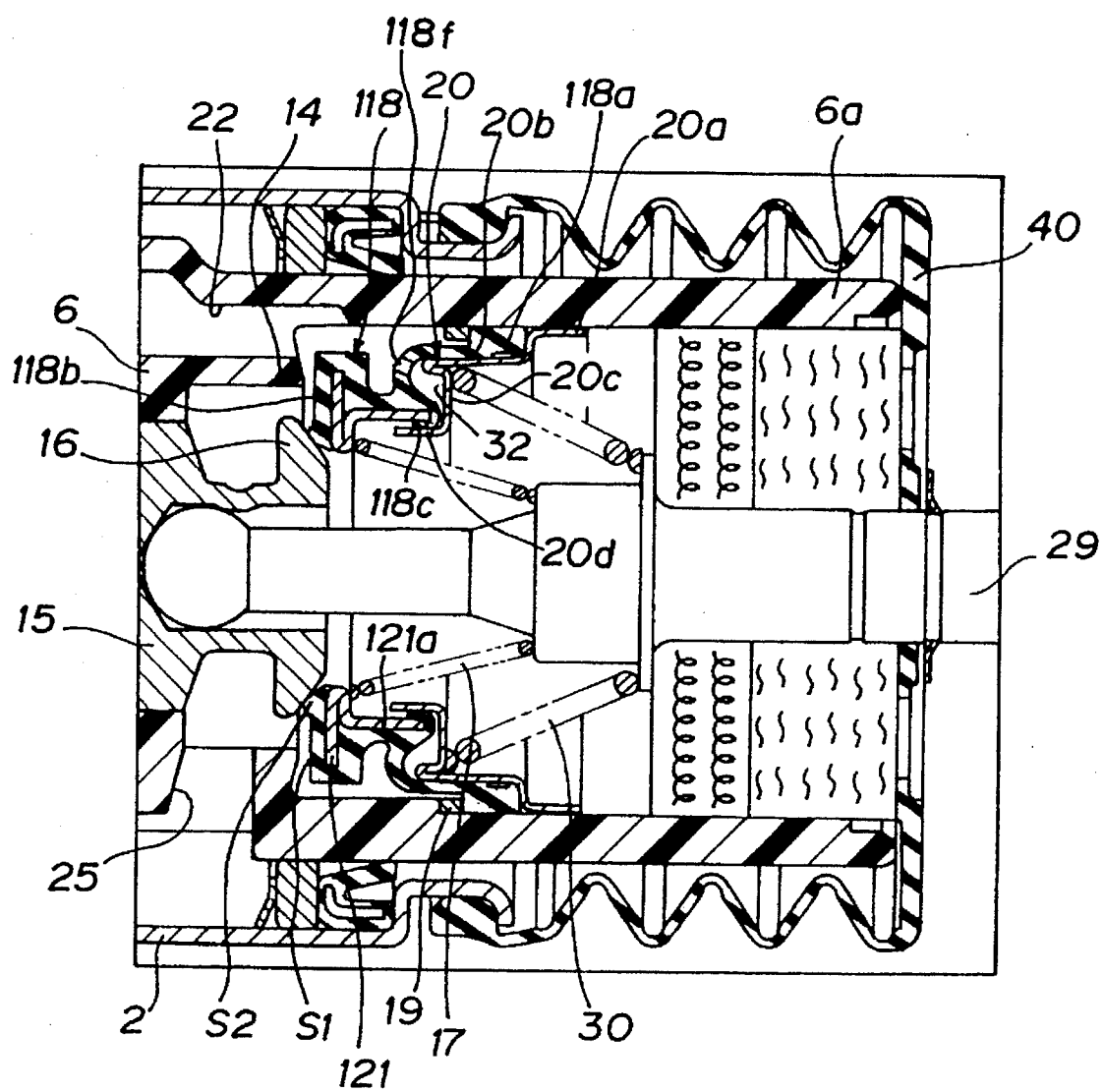
FIG. 4 is an enlarged section of part of a third embodiment of the invention.

FIG. 4 shows a further embodiment of the invention in which the backup plate 21 is formed by a thin sheet, the radially inner end of which is slightly folded back radially outward to define a tubular portion 121a extending axially rearward from a radial location which is slightly radially outward of the tubular portion 20d of the retainer 20. In addition, part of valve element 118 extends around the rear end of a tubular portion 121a to define a sliding seal 118c for sliding contact with the inner peripheral surface of the tubular portion 20d of the retainer 20. In other respects, the arrangement is similar to the first mentioned embodiment, and accordingly, corresponding parts are designated by like numerals and characters. In this embodiment, a sliding contact of the sliding seal 118c against the inner peripheral surface of the tubular portion 20d occurs more smoothly.

While the invention has been described above in connection with several embodiments thereof, it should be understood that a number of changes, modifications and substitutions therein will readily occur to one skilled in the art from the above disclosure without departing from the spirit and scope of the invention defined by the appended claims.

What is claimed is:

1. A valve mechanism for booster comprising a valve body having an annular first valve seat formed around an inner peripheral surface of the valve body, a valve plunger slidably fitted in the valve body inside the annular first valve seat and having an annular second valve seat formed on the valve plunger, a valve element including a seating area which is adapted to be seated upon the first valve seat or the second valve seat in contacting engagement therewith, a constant pressure passage communicating with a space located radially outward of a first seat defined by the contact between the first valve seat of the valve body and the valve element, a pressure passage communicating with a space located radially inward of a second seat defined by the contact between the second valve seat of the valve plunger and the valve element, and a variable pressure passage communicating with a space intermediate the first seat and the second seat, the valve element being formed by a tubular elastic body and including a mount which is adapted to be mounted on the inner peripheral surface of the valve body and a curved portion extending radially inward in a curved manner away from the mount to a distal end of the curved portion, the seating area being defined on the distal end of the curved portion;

the improvement comprising a retainer being mounted on the inner peripheral surface of the valve body, the retainer including an annular wall extending radially inward from the inner peripheral surface of the valve body to an inner periphery of the annular wall, and a tubular portion which is disposed inside the curved portion of the valve element and extends from the inner periphery of the annular wall, an inner peripheral surface of the curved portion of the valve element being formed with a sliding seal which is disposed in sliding contact with an outer peripheral surface of the tubular portion of the retainer to define a sealed chamber between the sliding seal and the annular wall, communication means being provided for communicating the sealed chamber with the constant pressure passage.

2. A valve mechanism for booster comprising a valve body having an annular first valve seat formed around an inner peripheral surface of the valve body, a valve plunger slidably fitted in the valve body inside the annular first valve seat and having an annular second valve seat formed on the valve plunger, a valve element having a seating area adapted to be seated upon either the first valve seat or the second valve seat in contacting engagement therewith, a constant pressure passage communicating with a space located radially outward of a first seat defined by the contact between the first valve seat of the valve body and the valve element, a pressure passage communicating with a space located radially inward of a second seat defined by the contact between the second valve seat of the valve plunger and the valve element, and a variable pressure passage communicating with a space located between the first seat and the second seat, the valve element comprising a tubular elastic body and including a mount which is adapted to be mounted on the inner peripheral surface of the valve body and a curved portion extending radially inward in a curved manner away from the mount to a distal end of the curved portion, the seating area being defined on the distal end of the curved portion;

the improvement comprising a retainer being mounted on the inner peripheral surface of the valve body, the retainer including an annular wall extending radially inward from the inner peripheral surface of the valve body to an inner periphery of the annular wall, and a tubular portion extending from the inner periphery of the annular wall into the inside of the curved portion of the valve element, an outer peripheral surface of the curved portion of the valve element being formed with a first sliding seal which is disposed in sliding contact with the outer peripheral surface of the tubular portion of the retainer to define a first sealed chamber between the first sliding seal and the annular wall, the outer periphery of the seating area of the valve element being formed with a second sliding seal which is disposed in sliding contact with the inner peripheral surface of the valve body to define a second sealed chamber between the second sliding seal and the curved portion, first communication means being provided for communicating the first and the second sealed chamber with each other and second communication means being provided for communicating the second sealed chamber with the variable pressure passage.

3. A valve mechanism for booster according to claim 1, in which a step is formed in the inner periphery of the valve body, the mount of the valve element being secured inside a rearward tubular terminal end of the valve body by being axially held sandwiched between a ring-shaped stop member fitted against the step in the valve body and the retainer which is fitted into the inner periphery of the valve body from a rear side, the annular wall of the retainer being located axially rearward of a rear end face of the curved portion of the valve element so as to be spaced therefrom, the tubular portion of the retainer having a diameter less than the inner diameter of the distal end of the inner periphery of the curved portion of the valve element so as to be spaced from the curved portion, a backup plate being embedded in the seating area of the valve element so as to support the seating area, a spring being disposed between the backup plate and an input shaft which is connected to the valve plunger to urge the seating area in an axially forward direction, a return spring being disposed between the input shaft and the valve body for urging the input shaft and the valve plunger in an axially rearward direction.

4. A valve mechanism for booster according to claim 1, in which the sliding seal of the valve element projects radially inward from the distal end of the inner periphery of the curved portion, the communicating means being formed in the valve element and defining a communication opening which allows the sealed chamber to communicate with the constant pressure passage, the backup plate being slightly folded back radially outward from the radially inner end thereof and then extending axially rearward to define a tubular portion which is located slightly radially outward of the retainer.

5. A valve mechanism for booster according to claim 4 in which part of the valve element extends around the inner peripheral surface of the tubular portion of the backup plate to define a sliding seal which is disposed in sliding contact with the inner peripheral surface of the retainer.

6. A valve mechanism for booster according to claim 2, in which the first sliding seal of the valve element projects radially inward from the distal end of the inner periphery of the curved portion, the second sliding seal of the valve element projecting radially outward from the outer periphery of the seating area, the first communication means and second communication means being formed in the valve element to define respective first and second communication openings, the first communication opening allowing the first and the second sealed chambers to communicate with each other and the second communication opening allowing the second sealed chamber to communicate with the variable pressure passage.

7. A valve mechanism for booster according to claim 2, in which a step is formed in the inner periphery of the valve body, the mount of the valve element being secured inside a rearward tubular terminal end of the valve body by being axially held sandwiched between a ring-shaped stop member fitted against the step in the valve body and the retainer which is fitted into the inner periphery of the valve body from a rear side, the annular wall of the retainer being located axially rearward of a rear end face of the curved portion of the valve element so as to be spaced therefrom, the tubular portion of the retainer having a diameter less than the inner diameter of the distal end of the inner periphery of the curved portion of the valve element so as to be spaced from the curved portion, a backup plate being embedded in the seating area of the valve element so as to support the seating area, a spring being disposed between the backup plate and an input shaft which is connected to the valve plunger to urge the seating area in an axially forward direction, a return spring being disposed between the input shaft and the valve body for urging the input shaft and the valve plunger in an axially rearward direction.

* * * * *